2,798,856
Patented July 9, 1957

2,798,856

STEAM STERILIZATION INDICATOR

John G. Hainsworth, Pasadena, Calif., assignor to Don Baxter, Inc., Glendale, Calif., a corporation of Nevada No Drawing. Application March 19, 1954, Serial No. 417,492

15 Claims. (Cl. 252—408)

This invention relates to an indicator designed to undergo a color change coincident with heating in an atmosphere of steam at a temperature for a duration of time suitable for effecting sterilization and, while the invention is not necessarily confined thereto, the steam sterilization indicator is designed to indicate whether or not an article provided with the indicator, such as surgical instruments or intravenous solutions, has been heated in the presence of sufficient heat and moisture for a period of time sufficient to effect sterilization.

Adequate steam sterilization occurs at a number of different temperatures and periods of time, the higher the temperature the shorter the period of time required; for example, sterilization in steam at a temperature of 228° F. for 28 minutes is generally adequate. Likewise, sterilization at 240° F. for 15 minutes is adequate.

It is an object of the present invention to provide a sterilization indicator possessing, first, the property that it will not undergo its characteristic change of color if heated in dry air but will undergo its characteristic change of color if heated in the presence of steam to the proper combination of temperature and time which is effective for sterilization; that is to say, it is an object of the present invention to provide a steam sterilization indicator which will undergo, in the presence of steam, the same characteristic change of color if heated at about 228° F. for 28 minutes as it does when heated in the presence of steam at a temperature of 240° F. for 15 minutes.

Primarily, the present invention depends on the discovery that nitroso-naphthol, when dispersed in a vehicle suitable for providing a coating, will undergo a characteristic, readily discernible, permanent color change, which color change occurs on the exposure of the coating for a period of time and temperature suitable for sterilization and is irreversible so that the coating remains as a permanent indicator that the article to which it is attached has undergone adequate sterilization.

I have found that 1-nitroso-2-naphthol, when dispersed as a coating in a suitable vehicle, such as an acrylic, nitrocellulose, or other natural or synthetic resin, undergoes a distinct color change from an original yellow through tan to a pink when autoclaved for suitable times and at suitable temperatures for effecting steam sterilization, such as at 228° F. for 28 minutes or 240° F. for 15 minutes. The mechanism responsible for this color change cannot be described with certainty, but it is possible that a shift in the structure of the 1-nitroso-2-naphthol from the normal configuration to the quinone-oxime form may be responsible. Likewise, the 2-nitroso-1-naphthol dispersed in suitable vehicles for forming a coating, undergoes a change of color, changing from yellow to tan and then to a red purple.

An important element of the present invention is the vehicle employed. The vehicle employed not only serves the function of providing a spreading agent for spreading a coating of the 1-nitroso-2-naphthols on a suitable surface and for bonding the same to that surface, but the vehicle also is important to the indicator because it provides a means by which the condition at which the indicator undergoes its characteristic change in color can be regulated or controlled so that the same will occur with the proper steam sterilization conditions; that is to say, a resin vehicle is to a certain extent water permeable and the characteristic color changes of the nitroso-naphthols are affected by the presence of water. By varying the type of resin the indicator may be caused to function under the desired conditions. For example, the indicator using the 1-nitroso-2-naphthol and methyl methacrylate resin was made to undergo its characteristic color change from yellow to pink at a desired autoclaving temperature of 240° F. for 15 minutes. When the 1-nitroso-2-naphthol was replaced by the 2-nitroso-1-napthol and dispersed in the same methyl methacrylate resin in the same proportions, it did not undergo its characteristic color change to pink until a more drastic sterilizing condition was reached, viz., 250° F. for 30 minutes. By substituting nitrocellulose for the methyl methacrylate resin vehicle, the condition at which the color change occurred was reduced to 240° F. for 15 minutes since the nitrocellulose lacquer is more water permeable.

In its form as a dry coating the indicator of the present invention thus comprises essentially an admixture of but two components, one a nitroso-naphthol and the other a transparent resin, such as acrylic or nitrocellulose resin. The proportions of these ingredients may undergo various changes with resins if it is desired to produce indicators which undergo their characteristic color change at different sterilization conditions. In general, however, to each 100 parts by weight of the dry resin vehicle, there is employed from 1 to 100 parts by weight of nitroso-naphthol. In producing a composition suitable for forming a coating there is also included in the composition one or more suitable solvents, which solvents later become evaporated from the produced coating. Suitable solvents include ketones, such as methyl ethyl ketone and acetone, ethers such as ethyl ether and isopropyl ether, aromatic hydrocarbons such as benzene, toluene and xylene, esters such as ethyl acetate and butyl acetate, alcohols such as butyl and amyl alcohol, and mixtures of these solvents. In producing the composition for forming the coating, to the 100 parts of the dry resin vehicle there is generally employed from 50 to 3000 parts of solvent.

As one example of the present invention, I have employed for each 100 parts by volume of a methyl methacrylate resin (40% in methyl ethyl ketone) 20 parts by volume of the solvent methyl ethyl ketone and 140 parts by volume of a 4% solution of 1-nitroso-2-naphthol dissolved in methyl ethyl ketone. The methyl methacrylate resin used was Acryloid A–101 made by Rohm & Haas. In a second example of the present invention I added to 100 parts by volume of a clear nitrocellulose lacquer 140 parts by volume of a 4% solution of 2-nitroso-1-naphthol in a lacquer thinner. The nitrocellulose lacquer was the B–954 sold by American Marietta.

The solution of the resin, nitroso-naphthols and solvent in accordance with the present invention may be utilized in various manners. For example, it may be employed for painting a coating on aluminum, on some plastics, or on part of a metallic cap of a container to indicate sterilization of bandages, surgical instruments, canned foods, intravenous solutions, etc. It can remain thereafter with the container as an indication as to whether the same has been subjected to steam sterilization.

In the first example the dry coating on aluminum was originally a yellow gold in color. When heated by dry heat to 248° F. for 15 minutes the color changed to a light orange brown. When heated to 212° F. for 14 minutes in the presence of steam a dark orange brown color developed. When heated to 240° F. for 3 minutes in the presence of steam a dark orange color is observed. All of the preceding conditions are inadequate for sterilization. When heated to 240° F. for 15 minutes in the presence of steam the color changed to pink, this condition being suitable for steam sterilization. Similarly, the coating of the second composition was originally a lemon yellow. It changed to a red purple on heating in dry heat at 248° F. for 15 minutes. In moist heat at 212° F. for 14 minutes it changed to a light brown. Likewise, at 240° F. for 3 minutes it was a light brown, but at 240° for 15 minutes it developed a red purple.

In the case of both the first and second examples of the invention, the color changed from yellow to either pink or deep purple in the presence of steam at 228° F. for 28 minutes. In the first example of the invention the color change did not occur when heated in the presence of dry heat. In the second example of the invention the color change will occur more readily on heating with dry heat. The first example of the invention is, therefore, recommended as more suitable if the indicator is required to be unresponsive to dry heat.

While the particular examples of the present invention herein described are well adapted to carry out the objects of the invention, this invention is of the scope set forth in the appended claims.

I claim:

1. A composition for producing a steam sterilization indicator coating, the composition comprising an admixture of a nitroso-naphthol capable of shifting from a normal configuration to a colored quinone-oxime form under steam sterilization conditions, a clear non-reactive, water-insolubile but partially water-permeable resin, and a solvent for said resin non-reactive with said nitroso-naphthol, the nitroso-naphthol being present in proportions from 1 to 100 parts by weight of nitroso-naphthol to each 100 parts by weight of dry resin and in such amount that the color after sterilization is clearly visible.

2. A composition as defined by claim 1 wherein the resin is selected from the group consisting of methyl methacrylate and nitrocellulose resins.

3. A composition as defined in claim 1 wherein the resin is methyl methacrylate and the nitroso-naphthol is 1-nitroso-2-naphthol.

4. A composition as defined in claim 1 wherein the resin is nitrocellulose and the nitroso-naphthol is 2-nitroso-1-naphthol.

5. A composition for producing a steam sterilization indicator coating, comprising: a resin selected from the group consisting of methyl methacrylate and nitrocellulose; a solvent for said resin; and a nitroso naphthol selected from the group consisting of 1-nitroso-2-naphthol and 2-nitroso-1-naphthol; said nitroso naphthol being present in substantially 15 parts by weight for each 100 parts of dry resin; and said solvent being compatible with the nitroso naphthol selected.

6. A composition for producing a steam sterilization indicator coating, comprising: a resin selected from the group consisting of methyl methacrylate and nitrocellulose; a solvent for said resin containing at least one component selected from the group consisting of acetone, methyl ethyl ketone, ethyl ether, isopropyl ether, benzene, toluene, xylene, ethyl acetate, butyl acetate, butyl alcohol, and amyl alcohol; and a nitroso naphthol selected from the group consisting of 1-nitroso-2-naphthol and 2-nitroso-1-naphthol; said nitroso-naphthol being present in substantially 15 parts by weight for each 100 parts of dry resin.

7. A composition for producing a steam sterilization indicator coating, comprising: methyl methacrylate resin in solution in methyl ethyl ketone, and 1-nitroso-2-naphthol in proportions of substantially 15 parts by weight 1-nitroso-2-naphthol to each 100 parts of dry resin.

8. An article having applied thereto a steam sterilization indicator which consists essentially of an admixture of a nitroso-naphthol capable of shifting from a normal configuration to a colored quinone-oxime form under steam sterilization conditions, and a clear non-reactive, water-insoluble but partially water-permeable resin, the nitroso-naphthol being present in proportions from 1 to 100 parts by weight of nitroso-naphthol to each 100 parts by weight of dry resin and in such amount that the color after sterilization is clearly visible.

9. An article as defined in claim 8 wherein the resin constituent of the steam sterilization indicator is selected from the group consisting of methyl methacrylate and nitrocellulose resins.

10. An article as defined in claim 8 wherein the resin constituent of the steam sterilization indicator is selected from the group consisting of methyl methacrylate and nitrocellulose resins and wherein the nitroso-naphthol constituent is selected from the group consisting of 1-nitroso-2-naphthol and 2-nitroso-1-naphthol.

11. The article as defined in claim 8 wherein the resin constituent of the steam sterilization indicator is selected from the group consisting of methyl methacrylate and nitrocellulose resins and wherein the nitroso-naphthol constituent is 1-nitroso-2-naphthol.

12. The article as defined in claim 8 wherein the resin constituent of the steam sterilization indicator is selected from the group consisting of methyl methacrylate and nitrocellulose resins and wherein the nitroso-naphthol constituent is 2-nitroso-1-naphthol.

13. The article as defined in claim 8 wherein the resin constituent of the steam sterilization indicator is methyl methacrylate and wherein the nitroso-naphthol is 1-nitroso-2-naphthol.

14. The article as defined in claim 8 wherein the resin constituent of the steam sterilization indicator is nitrocellulose and the nitroso-naphthol constituent is 2-nitroso-1-naphthol.

15. An article having applied thereto a steam sterilization indicator which consists essentially of a non-reactive, partially water-permeable resin selected from the group consisting of methyl methacrylate and nitrocellulose resins and a nitroso-naphthol selected from the group consisting of 1-nitroso-2-naphthol and 2-nitroso-1-naphthol in proportions of substantially 15 parts by weight of nitroso-naphthol to each 100 parts of the dry resin.

References Cited in the file of this patent

UNITED STATES PATENTS

| | | |
|---|---|---|
| 2,209,087 | Leuch | July 23, 1940 |
| 2,261,473 | Jennings | Nov. 4, 1941 |
| 2,606,654 | Davis | Aug. 12, 1952 |

FOREIGN PATENTS

| | | |
|---|---|---|
| 446,319 | Great Britain | Apr. 28, 1936 |

OTHER REFERENCES

"Organic Dyestuffs," 1914, Wahl, chapter XI, pages 91–92, G. Beel and Sons Ltd. London.